United States Patent
Hurtta et al.

(10) Patent No.: US 7,054,945 B2
(45) Date of Patent: May 30, 2006

(54) TECHNIQUE FOR PROVIDING ANNOUNCEMENTS IN MOBILE-ORIGINATED CALLS

(75) Inventors: Tuija Hurtta, Espoo (FI); Stefano Faccin, Dallas, TX (US); Nedko Ivanov, Budapest (HU); Bertenyi Balazs, Budapest (HU)

(73) Assignee: Nokia Corporation, Espoo (FI)

( * ) Notice: Subject to any disclaimer, the term of this patent is extended or adjusted under 35 U.S.C. 154(b) by 654 days.

(21) Appl. No.: 09/827,917

(22) Filed: Apr. 9, 2001

(65) Prior Publication Data

US 2002/0147824 A1      Oct. 10, 2002

(51) Int. Cl.
*G06F 15/16*       (2006.01)
(52) U.S. Cl. .............. 709/230; 709/227; 709/228; 709/234; 370/230.1; 370/469; 370/356; 370/354; 370/335
(58) Field of Classification Search ............... 709/230, 709/227, 228, 234; 370/230.1, 353, 469, 370/356, 354, 335, 328, 466
See application file for complete search history.

(56) References Cited

U.S. PATENT DOCUMENTS

| | | | |
|---|---|---|---|
| 6,272,148 B1 | 8/2001 | Takagi et al. | |
| 6,546,247 B1 * | 4/2003 | Foti et al. | 455/433 |
| 6,574,201 B1 * | 6/2003 | Kreppel | 370/328 |
| 6,608,832 B1 * | 8/2003 | Forslow | 370/353 |
| 6,621,793 B1 * | 9/2003 | Widegren et al. | 370/230.1 |
| 6,654,610 B1 * | 11/2003 | Chen et al. | 455/450 |
| 6,707,813 B1 * | 3/2004 | Hasan et al. | 370/356 |
| 6,834,044 B1 * | 12/2004 | Sugirtharaj et al. | 370/328 |
| 2002/0034166 A1 * | 3/2002 | Barany et al. | 370/329 |

FOREIGN PATENT DOCUMENTS

WO      WO 01/78328 A2    10/2001

OTHER PUBLICATIONS

Notification of Transmittal of International Preliminary Examination Report; PCT.

* cited by examiner

*Primary Examiner*—Anthony Knight
*Assistant Examiner*—Thomas Pham
(74) *Attorney, Agent, or Firm*—Squire, Sanders & Dempsey LLP

(57) ABSTRACT

A technique for providing an announcement in a communications network includes setting up a first level communication session in a first network element of the network. A determination is then made that an announcement is to be played to the first network element. An identity of a second network element which is to play the announcement on the first communication session is then sent and after a second level communication session is set up, the second level communication channel parameters are modified in accordance with the transmitted identity. The second network element then plays the announcement to the first network element. The transmitted identity may include an IP address or a port number or a TA. The communication session may include a PDP context. The first network element may include a Mobile Station.

30 Claims, 6 Drawing Sheets

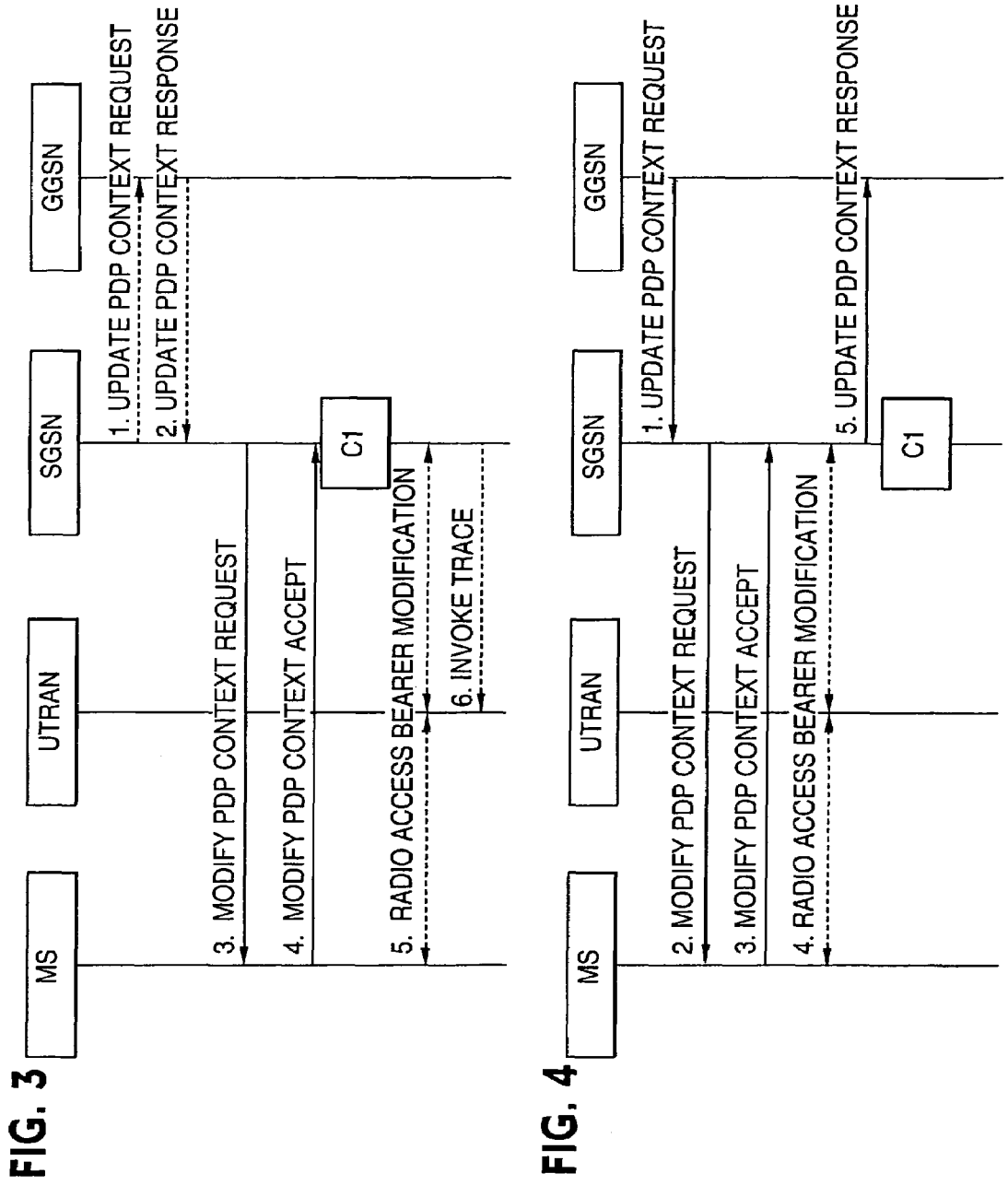

TECHNIQUE FOR PROVIDING ANNOUNCEMENTS IN MOBILE-ORIGINATED CALLS

BACKGROUND OF THE INVENTION

The present invention relates to mobile networks and more particularly, the present invention relates to a technique for providing announcements for mobile-originated calls in a mobile network using an IP (Internet Protocol) transport mechanism. In general, packet switched wireless networks provide communications for mobile terminals with no physical connection required for network access. The General Packet Radio Service (GPRS) in the Global System for Mobile communications (GSM) and the Universal Mobile Terrestrial System (UMTS) have both been developed to provide wireless communications networks with a packet switched side as well as a circuit switched side.

As noted in their WebSite, http://www.3gpp.org, the Third Generation Partnership Project, normally known by their acronym 3GPP, is an organization whose Partners have agreed to cooperate in the production of globally applicable Technical Specifications and Technical Reports for a 3rd Generation Mobile System based on GSM core networks and the radial access technologies that they support (i.e., Universal Terrestrial Radio Access (UTRA) both Frequency Division Duplex (FDD) and Time Division Duplex (TDD) modes).

The 3GPP Partners have further agreed to cooperate in the maintenance and development of Global System for Mobile communication (GSM) Technical Specifications and Technical Reports including evolved radial access technologies (e.g., General Packet Radio Service (GPRS) and Enhanced Data rates for GSM Evolution (EDGE)).

The 3GPP thus issues various Technical Specifications which are then utilized by the telecommunications industry to produce mobile terminals and associated systems which have been standardized such that a mobile terminal of one manufacturer can communicate with a system or mobile terminal of another manufacturer. These Technical Specifications are constantly revised in accordance with agreements by the 3GPP Partners to allow for changes and improvements in technology.

Technical Specification TS 23.0.60, Version V3.3.0, was issued in January, 2001 by the 3GPP and defines the stage-2 service description for the packet domain, which includes the GPRS in GSM and UMTS. This technical specification is incorporated by reference herein in its entirety. The description of various elements and their functions incorporated by reference herein merely constitute a non-limiting example of packet switched wireless communication networks and it is to be understood that the present invention is not limited to such networks.

A network subscriber can have one or more (PDP) addresses. Each PDP address is described by one or more PDP contexts in the Mobile Station (MS), the Service GPRS Support Node (SGSN), and the Gateway GPRS Support Node (GGSN). A GGSN is a gateway to an external network. Each PDP context may have routing and mapping information for directing the transfer of data to and from its associated PDP address and a Traffic Flow Template (TFT) for reviewing the transferred data.

Each PDP context can be selectively and independently activated, modified, and deactivated. The activation state of the PDP context indicates whether data transfer is enabled for a corresponding PDP address and TFT. If all PDP contexts associated with the same PDP address are inactive or deactivated, all data transfer for that PDP address is disabled. All PDP contexts of a subscriber are associated with the same Mobility Management (MM) context for the International Mobile Subscriber Identity (IMSI) of that subscriber. Setting up a PDP context means setting up a communication channel between the MS and the GGSN.

FIG. 1, provided for exemplary purposes only, illustrates the PDP context activation procedure between an MS and a GGSN in a UMTS system and corresponds to FIG. 62 of the aforecited Technical Specification. The following discussion of the steps of FIG. 1 are also contained therein.

1) The MS sends an Activate PDP Context Request (NSAPI, TI, PDP Type, PDP Address, Access Point Name, QoS Requested, PDP Configuration Options) message to the SGSN. The MS shall use PDP Address to indicate whether it requires the use of a static PDP address or whether it requires the use of a dynamic PDP address. The MS shall leave PDP Address empty to request a dynamic PDP address. The MS may use Access Point Name to select a reference point to a certain external network and/or to select a service. Access Point Name is a logical name referring to the external packet data network and/or to a service that the subscriber wishes to connect to. QoS Requested indicates the desired QoS profile. PDP Configuration Options may be used to request optional PDP parameters from the GGSN (see GSM 09.60). PDP Configuration Options is sent transparently through the SGSN.

3) In UMTS, RAB setup is done by the RAB Assignment procedure, see subclause "RAB Assignment Procedure".

5) The SGSN validates the Activate PDP Context Request using PDP Type (optional), PDP Address (optional), and Access Point Name (optional) provided by the MS and the PDP context subscription records. The validation criteria, the APN selection criteria, and the mapping from APN to a GGSN are described in annex A.

If no GGSN address can be derived or if the SGSN has determined that the Activate PDP Context Request is not valid according to the rules described in annex A, then the SGSN rejects the PDP context activation request.

If a GGSN address can be derived, the SGSN creates a TEID for the requested PDP context. If the MS requests a dynamic address, then the SGSN lets a GGSN allocate the dynamic address. The SGSN may restrict the requested QoS attributes given its capabilities, the current load, and the subscribed QoS profile.

The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, OMC Identity, PDP Configuration Options) message to the affected GGSN. Access Point Name shall be the APN Network Identifier of the APN selected according to the procedure described in annex A. PDP Address shall be empty if a dynamic address is requested. The GGSN may use Access Point Name to find an external network and optionally to activate a service for this APN. Selection Mode indicates whether a subscribed APN was selected, or whether a non-subscribed APN sent by MS or a non-subscribed APN chosen by SGSN was selected. Selection Mode is set according to annex A. The GGSN may use Selection Mode when deciding whether to accept or reject the PDP context activation. For example, if an APN requires subscription, then the GGSN is configured to accept only the PDP context activation that requests a subscribed APN as indicated by the SGSN with Selection Mode. Charging Characteristics indicates which kind of charging the PDP context is liable for. The SGSN shall copy Charging Characteristics from Subscribed Charging Characteristics if received from the HLR. The SGSN shall include Trace Reference, Trace Type, Trigger Id, and OMC Identity if GGSN trace is activated. The SGSN shall copy Trace Reference, Trace Type, and OMC Identity from the trace information received from the HLR or OMC.

The GGSN creates a new entry in its PDP context table and generates a Charging Id. The new entry allows the GGSN to route PDP PDUs between the SGSN and the external PDP network, and to start charging. The GGSN may further restrict QoS Negotiated given its capabilities and the current load. The GGSN then returns a Create PDP Context Response (TEID, PDP Address, PDP Configuration Options, QoS Negotiated, Charging Id, Cause) message to the SGSN. PDP Address is included if the GGSN allocated a PDP address. If the GGSN has been configured by the operator to use External PDN Address Allocation for the requested APN, then PDP Address shall be set to 0.0.0.0, indicating that the PDP address shall be negotiated by the MS with the external PDN after completion of the PDP Context Activation procedure. The GGSN shall relay, modify, and monitor these negotiations as long as the PDP context is in ACTIVE state and use the GGSN-Initiated PDP Context Modification procedure to transfer the currently-used PDP address to the SGSN and the MS. PDP Configuration Options contain optional PDP parameters that the GGSN may transfer to the MS. These optional PDP parameters may be requested by the MS in the Activate PDP Context Request message, or may be sent unsolicited by the GGSN. PDP Configuration Options is sent transparently through the SGSN. The Create PDP Context messages are sent over the backbone network.

If QoS Negotiated received from the SGSN is incompatible with the PDP context being activated, then the GGSN rejects the Create PDP Context Request message. The compatible QoS profiles are configured by the GGSN operator.

7) The SGSN inserts the NSAPI along with the GGSN address in its PDP context. If the MS has requested a dynamic address, the PDP address received from the GGSN is inserted in the PDP context. The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the MS. The SGSN is now able to route PDP PDUs between the GGSN and the MS, and to start charging.

Similarly, FIG. 2, also provided for exemplary purposes only, illustrates the secondary PDP Context Activation procedure and corresponds to FIG. 64 of the aforecited Technical Specification. The following discussion of the steps of FIG. 2 are also contained therein.

The Secondary PDP Context Activation procedure may be used to activate a PDP context while reusing the PDP address and other PDP context information from an already active PDP context, but with a different QoS profile. Procedures for APN selection and PDP address negotiation are not executed. Each PDP context sharing the same PDP address and APN shall be identified by a unique TI and a unique NSAPI.

The Secondary PDP Context Activation procedure may be executed without providing a Traffic Flow Template (TFT) to the newly activated PDP context if all other active PDP contexts for this PDP address and APN already have an associated TFT, otherwise a TFT shall be provided. The TFT contains attributes that specify an IP header filter that is used to direct data packets received from the interconnected external packet data network to the newly activated PDP context.

1) The MS sends an Activate Secondary PDP Context Request (Linked TI, NSAPI, TI, QoS Requested, TFT) message to the SGSN. Linked TI indicates the TI value assigned to any one of the already activated PDP contexts for this PDP address and APN. QoS Requested indicates the desired QoS profile. TFT is sent transparently through the SGSN to the GGSN to enable packet classification for downlink data transfer. TI and NSAPI contain values not used by any other activated PDP context.

3) In UMTS, RAB setup is done by the RAB Assignment procedure.

4) The SGSN validates the Activate Secondary PDP Context Request using the TI indicated by Linked TI. The same GGSN address is used by the SGSN as for the already-activated PDP context(s) for that TI and PDP address.

The SGSN and GGSN may restrict and negotiate the requested QoS as specified in subclause "PDP Context Activation Procedure". The SGSN sends a Create PDP Context Request (QoS Negotiated, TEID, NSAPI, Primary NSAPI, TFT) message to the affected GGSN. Primary NSAPI indicates the NSAPI value assigned to any one of the already activated PDP contexts for this PDP address and APN. TFT is included only if received in the Activate Secondary PDP Context Request message. The GGSN uses the same external network as used by the already-activated PDP context(s) for that PDP address, generates a new entry in its PDP context table, and stores the TFT. The new entry allows the GGSN to route PDP PDUs via different GTP tunnels between the SGSN and the external PDP network. The GGSN returns a Create PDP Context Response (TEID, QoS Negotiated, Cause) message to the SGSN.

6) The SGSN selects Radio Priority and Packet Flow Id based on QoS Negotiated, and returns an Activate Secondary PDP Context Accept (TI, QoS Negotiated, Radio Priority, Packet Flow Id) message to the MS. The SGSN is now able to route PDP PDUs between the GGSN and the MS via different GTP tunnels and possibly different LLC links.

FIG. 3, also provided for exemplary purposes only, illustrates the SGSN-initiated PDP context modification procedure and corresponds to FIG. 68 of the aforerecited Technical Specification. The following discussion of the steps in FIG. 3 is also contained therein.

An MS or GGSN can request, an SGSN can decide, possibly triggered by the HLR as explained in subclause "Insert Subscriber Data Procedure" or triggered by a RAB Release procedure initiated by an RNC, or an MS and SGSN can decide after an RNC-initiated Iu release, to modify parameters that were negotiated during an activation procedure for one or several PDP contexts. The following parameters can be modified:

QoS Negotiated;
Radio Priority;
Packet Flow Id;
PDP Address (in case of the GGSN-initiated modification procedure); and
TFT (in case of MS-initiated modification procedure).

The SGSN can request the modification of parameters by sending a Modify PDP Context Request message to the MS.

A GGSN can request the modification of parameters by sending an Update PDP Context Request message to the SGSN.

An MS can request the modification of parameters by sending a Modify PDP Context Request message to the SGSN.

An RNC can request an Iu release by sending an Iu Release Request message to the SGSN. After Iu release the MS and SGSN shall modify the PDP contexts according to the rules defined in subclause "RNC-Initiated PDP Context Modification Procedure".

An RNC can request the release of a radio access bearer. After RAB release the MS and the SGSN shall locally modify the corresponding PDP context according to rules defined in the subclause "RAB Release-Initiated Local PDP Context Modification Procedure".

A trace may be activated while a PDP context is active. To enable trace activation in a GGSN, the SGSN shall send an Update PDP Context Request message to the GGSN. If PDP context modification is performed only to activate a trace, then the SGSN shall not send a Modify PDP Context Request message to the MS.

1) The SGSN may send an Update PDP Context Request (TEID, NSAPI, QoS Negotiated, Trace Reference, Trace Type, Trigger Id, OMC Identity) message to the GGSN. If QoS Negotiated received from the SGSN is incompatible with the PDP context being modified, then the GGSN rejects the Update PDP Context Request. The compatible QoS profiles are configured by the GGSN operator. The SGSN shall include Trace Reference, Trace Type, Trigger Id, and OMC Identity in the message if GGSN trace is activated while the PDP context is active. The SGSN shall copy Trace Reference, Trace Type, and OMC Identity from the trace information received from the HLR or OMC.
2) The GGSN may restrict QoS Negotiated given its capabilities and the current load. The GGSN stores QoS Negotiated and returns an Update PDP Context Response (TEID, QoS Negotiated, Cause) message.
3) The SGSN selects Radio Priority and Packet Flow Id based on QoS Negotiated, and may send a Modify PDP Context Request (TI, QoS Negotiated, Radio Priority, Packet Flow Id) message to the MS.
4) The MS acknowledges by returning a Modify PDP Context Accept message. If the MS does not accept the new QoS Negotiated it shall instead de-activate the PDP context with the PDP Context Deactivation Initiated by MS procedure.
5) In UMTS, radio access bearer modification may be performed by the RAB Assignment procedure.
6) If BSS trace is activated while the PDP context is active, then the SGSN shall send an Invoke Trace (Trace Reference, Trace Type, Trigger Id, OMC Identity) message to the BSS or UTRAN. Trace Reference, and Trace Type are copied from the trace information received from the HLR or OMC.
1) The SGSN may send an Update PDP Context Request (TEID, NSAPI, QoS Negotiated, Trace Reference, Trace Type, Trigger Id, OMC Identity) message to the GGSN. If QoS Negotiated received from the SGSN is incompatible with the PDP context being modified, then the GGSN rejects the Update PDP Context Request. The compatible QoS profiles are configured by the GGSN operator. The SGSN shall include Trace Reference, Trace Type, Trigger Id, and OMC Identity in the message if GGSN trace is activated while the PDP context is active. The SGSN shall copy Trace Reference, Trace Type, and OMC Identity from the trace information received from the HLR or OMC.
2) The GGSN may restrict QoS Negotiated given its capabilities and the current load. The GGSN stores QoS Negotiated and returns an Update PDP Context Response (TEID, QoS Negotiated, Cause) message.
3) The SGSN selects Radio Priority and Packet Flow Id based on QoS Negotiated, and may send a Modify PDP Context Request (TI, QoS Negotiated, Radio Priority, Packet Flow Id) message to the MS.
4) The MS acknowledges by returning a Modify PDP Context Accept message. If the MS does not accept the new QoS Negotiated it shall instead de-activate the PDP context with the PDP Context Deactivation Initiated by MS procedure.
5) In UMTS, radio access bearer modification may be performed by the RAB Assignment procedure.
6) If BSS trace is activated while the PDP context is active, then the SGSN shall send an Invoke Trace (Trace Reference, Trace Type, Trigger Id, OMC Identity) message to the BSS or UTRAN. Trace Reference, and Trace Type are copied from the trace information received from the HLR or OMC.

FIG. 4, also provided for exemplary purposes only, illustrates the GGSN-initiated PDP context modification procedure and corresponds to FIG. 69 of the aforecited Technical Specification. The following discussion of the steps of FIG. 4 are also contained therein.

1) The GGSN sends an Update PDP Context Request (TEID, NSAPI, PDP Address, QoS Requested) message to the SGSN. QoS Requested indicates the desired QoS profile. PDP Address is optional.
2) The SGSN may restrict the desired QoS profile given its capabilities, the current load, the current QoS profile, and the subscribed QoS profile. The SGSN selects Radio Priority and Packet Flow Id based on QoS Negotiated, and sends a Modify PDP Context Request (TI, PDP Address, QoS Negotiated, Radio Priority, Packet Flow Id) message to the MS. PDP Address is optional.
3) The MS acknowledges by returning a Modify PDP Context Accept message. If the MS does not accept the new QoS Negotiated it shall instead de-activate the PDP context with the PDP Context Deactivation Initiated by MS procedure.
4) In UMTS, radio access bearer modification may be performed by the RAB Assignment procedure.
5) Upon receipt of the Modify PDP Context Accept message, or upon completion of the RAB modification procedure, the SGSN returns an Update PDP Context Response (TEID, QoS Negotiated) message to the GGSN. If the SGSN receives a Deactivate PDP Context Request message, it shall instead follow the PDP Context Deactivation Initiated by MS procedure.

FIG. 5, also provided for exemplary purposes only, illustrates the MS-initiated PDP context modification procedure and corresponds to FIG. 70 of the aforecited Technical Specification. The following discussion of the steps of FIG. 5 are also contained therein.

1) The MS sends a Modify PDP Context Request (TI, QoS Requested, TFT) message to the SGSN. Either QoS Requested or TFT or both may be included. QoS Requested indicates the desired QoS profile, while TFT indicates the TFT that is to be added or modified or deleted from the PDP context.
2) The SGSN may restrict the desired QoS profile given its capabilities, the current load, and the subscribed QoS profile. The SGSN sends an Update PDP Context Request (TEID, NSAPI, QoS Negotiated, TFT) message to the GGSN. If QoS Negotiated and/or TFT received from the SGSN is incompatible with the PDP context being modified (e.g., TFT contains inconsistent packet filters), then the GGSN rejects the Update PDP Context Request. The compatible QoS profiles are configured by the GGSN operator.
3) The GGSN may further restrict QoS Negotiated given its capabilities and the current load. The GGSN stores QoS Negotiated, stores, modifies, or deletes TFT of that PDP context as indicated in TFT, and returns an Update PDP Context Response (TEID, QoS Negotiated) message.

4) In UMTS, radio access bearer modification may be performed by the RAB Assignment procedure.

5) The SGSN selects Radio Priority and Packet Flow Id based on QoS Negotiated, and returns a Modify PDP Context Accept (TI, QoS Negotiated, Radio Priority, Packet Flow Id) message to the MS.

NOTE: If the SGSN does not accept QoS Requested, then steps 2 and 3 of this procedure are skipped, and the existing QoS Negotiated is returned to the MS in step 4.

In spite of the numerous details provided in the aforecited Technical Specification, many features associated with mobile networks have not been dealt with. Namely, techniques for providing announcements in mobile-originated calls have yet to be incorporated in the aforecited technical specification and it is these details to which the present invention is directed.

SUMMARY OF THE INVENTION

In the present invention, the signaling exchanged by the application layer in the MS is arranged in accordance with the procedure/messages that need to be performed by the transport levels in the MS and in the network in order to set up IP multimedia calls.

When the application level in the MS sends a setup message to set up an IP multimedia call, before or after sending such a message over the radio interface, the MS performs the appropriate procedures, depending on the type of access adopted, to set up the appropriate bearers over the radio interface and in the network to satisfy the call requirements specified by the application level in the setup message.

The technique of the present invention applies to the case of mobile-originated calls, the MS performing the above-noted transport level procedures before or after sending a setup message and before sending a confirmation/call acceptance message back to the called party.

In the technique in accordance with the present invention, for a mobile-originated call to be responded to by an announcement, the MS is informed of the transport address of the node which will play the announcement and the MS then initiates a PDP context modification procedure to set the Traffic Flow Template (TFT) according to the Transport Address (TA) of the node.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following is a brief description of the drawings, wherein:

FIGS. 3–5 illustrate the steps respectively occurring in a SGSN-initiated, GGSN-initiated and MS-initiated PDP context modification procedure.

DETAILED DESCRIPTION OF THE INVENTION

Figure 1:
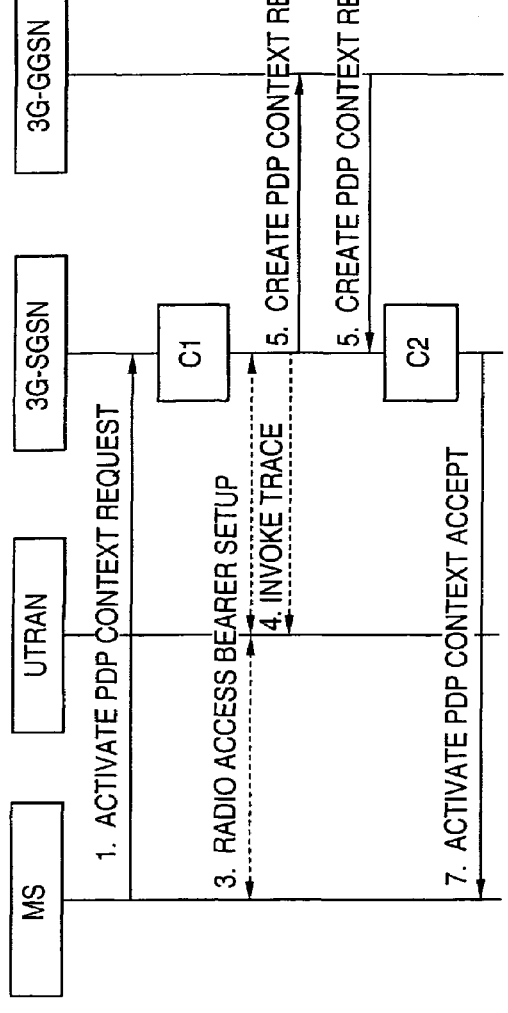
FIG. 1 illustrates the steps in a PDP context activation procedure.
Figure 2:
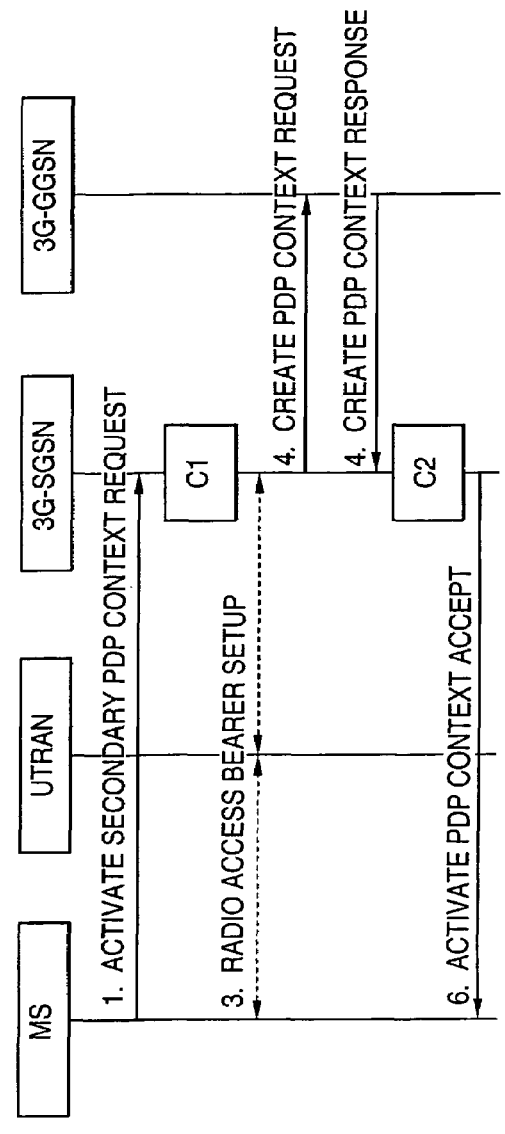
FIG. 2 illustrates the steps in a secondary PDP context activation procedure.

Before beginning a detailed description of the subject invention, mention of the following is in order. When appropriate, like reference numerals and characters may be used to designate identical, corresponding, or similar components in differing drawing figures. Furthermore, and the detailed description to follow, example sizes/models/values/ranges may be given, although the present invention is not limited thereto. Lastly, well-known elements may not be shown within the drawing figures for simplicity of illustration and discussion and so as not to obscure the invention.

In addition to the aforecited Technical Specification, Technical Specification TS 23.228, Version V1.5.0, issued by the 3GPP in March, 2001, defines the stage-2 service description for the IP Multimedia (IM) Subsystem, which includes the elements necessary to support IP Multimedia (IM) services in UMTS. This technical specification is incorporated by reference herein in its entirety and, as in the case of the previously cited Technical Specification, the elements and their functions incorporated by reference herein are merely a non-limiting example of packet switched wireless communication networks and the present invention should not be construed as being limited thereto.

Figure 5:
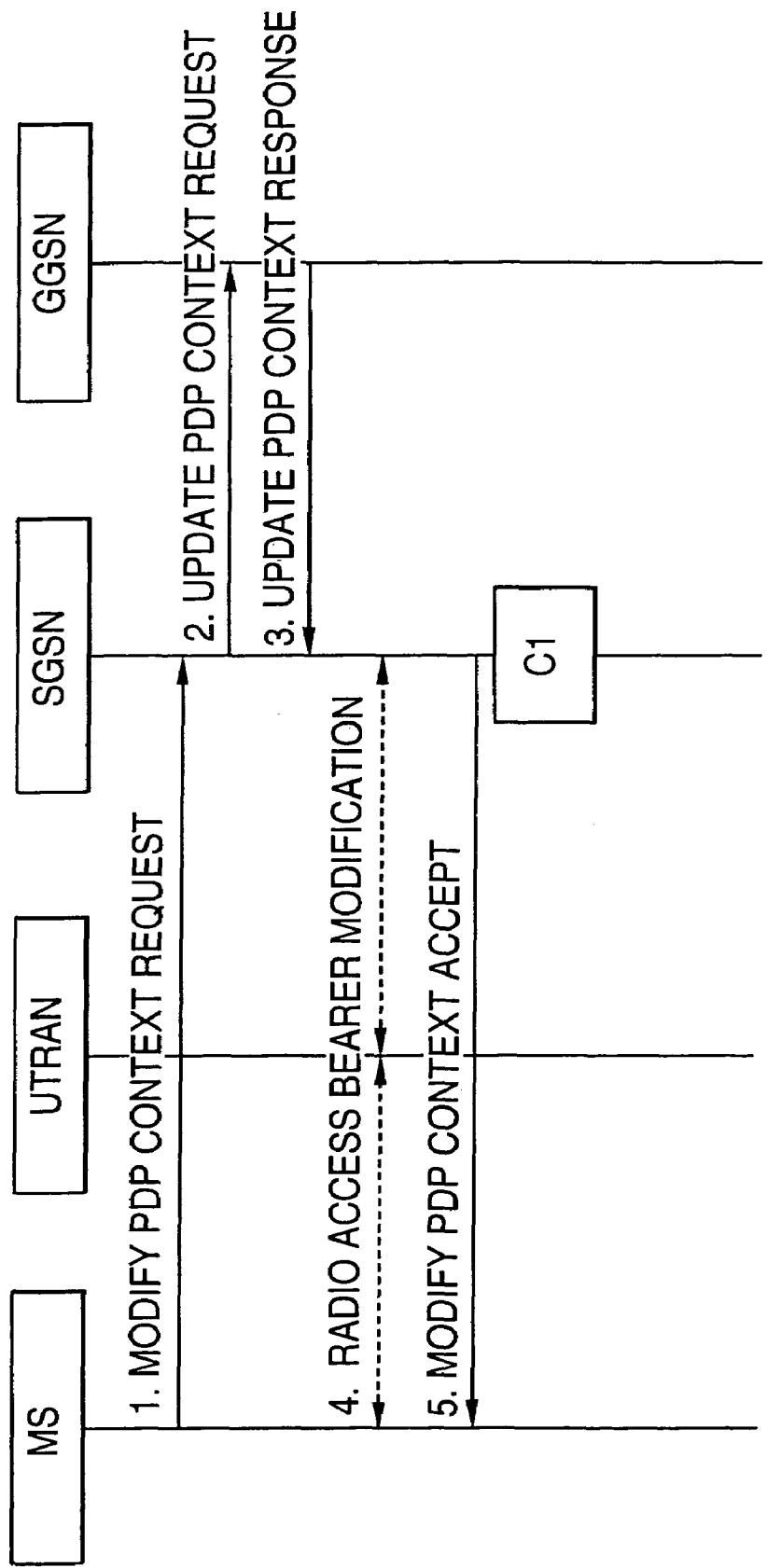
Figure 6:
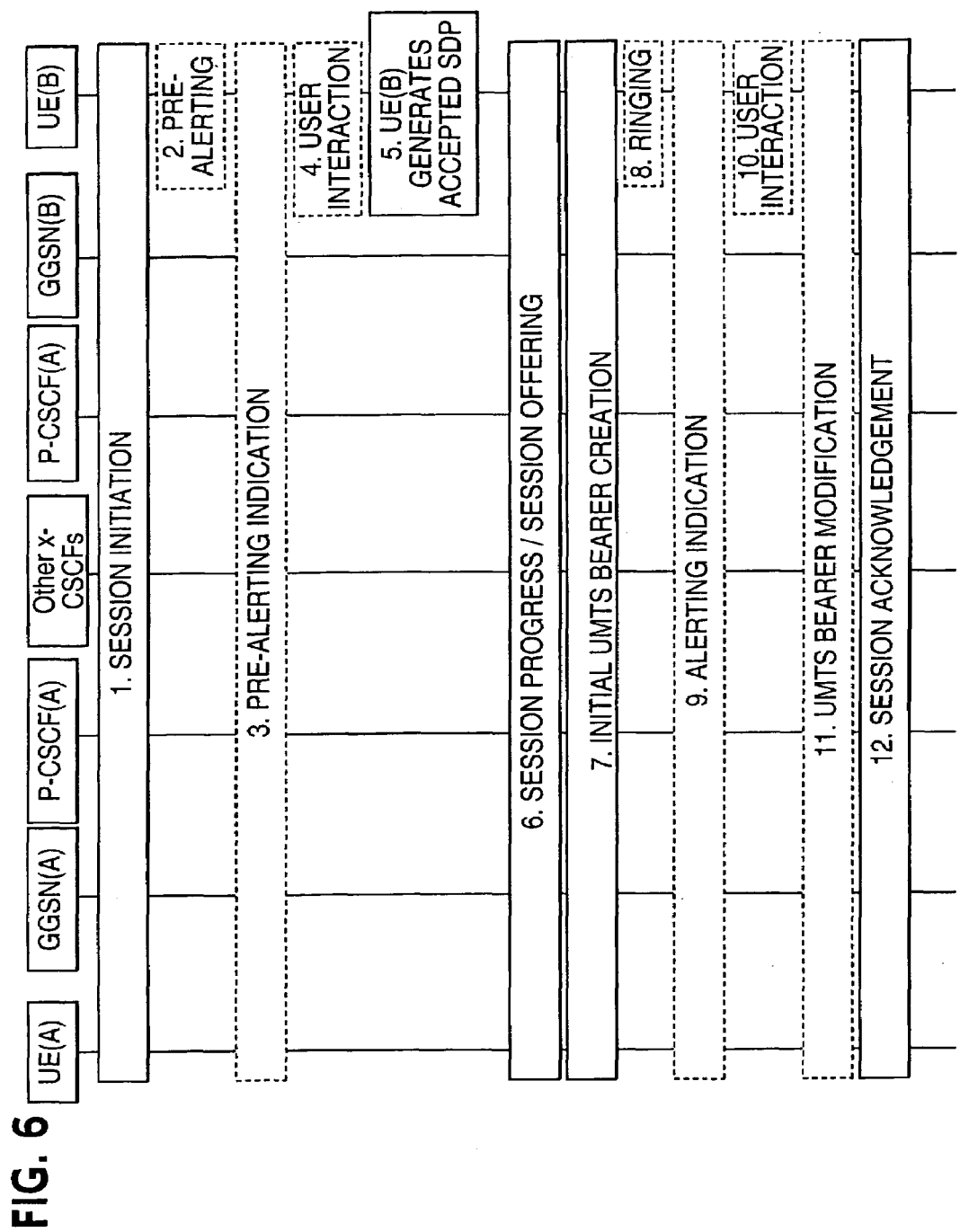
FIGS. 6 and 7 also illustrate in detail the steps occurring in a call setup procedure.

FIG. 6, which corresponds to FIG. 5.7 of the TS 23.228 Technical Specification, illustrates in detail the following steps occurring in a call setup procedure:

1. UE(A) starts a Session Initiation procedure to UE(B) that includes an SDP proposal.

2. The user at UE(B) is pre-alerted. (optional)

3. An indication of the pre-alerting may be sent towards UE(A). (optional)

4. User at UE(B) will then interact and express his/her wishes regarding the actual session. (optional)

5. UE(B) generates accepted SDP based on terminal settings, terminal reconfigured profiles and, optionally, the user's wishes.

6. The accepted SDP is forwarded to UE(A) in the payload of a reliable SIP response.

7. Initial bearer creation procedure is performed. During this bearer creation step, the resources in the UE(A)'s and UE(B)'s access network are reserved with PDP context procedures. Bearer resources in external networks may also be reserved at this point.

8. Terminal at UE(B) starts ringing. (optional)

9. The alerting indication is sent towards UE(A). (optional)

10. User at UE(B) may interact and express his/her wishes regarding the actual session. (optional)

11. UE(A) and UE(B) may perform bearer modification procedure at this point if the initial bearers reserved in step 7 and the wishes of user at UE(B) are different. During this bearer modification step, the resources in the UE(A)'s and UE(B)'s access network may be modified by modifying the PDP context, and the resource reservation in the external network may also be modified.

12. Session initiation procedure is acknowledged.

Figure 7:
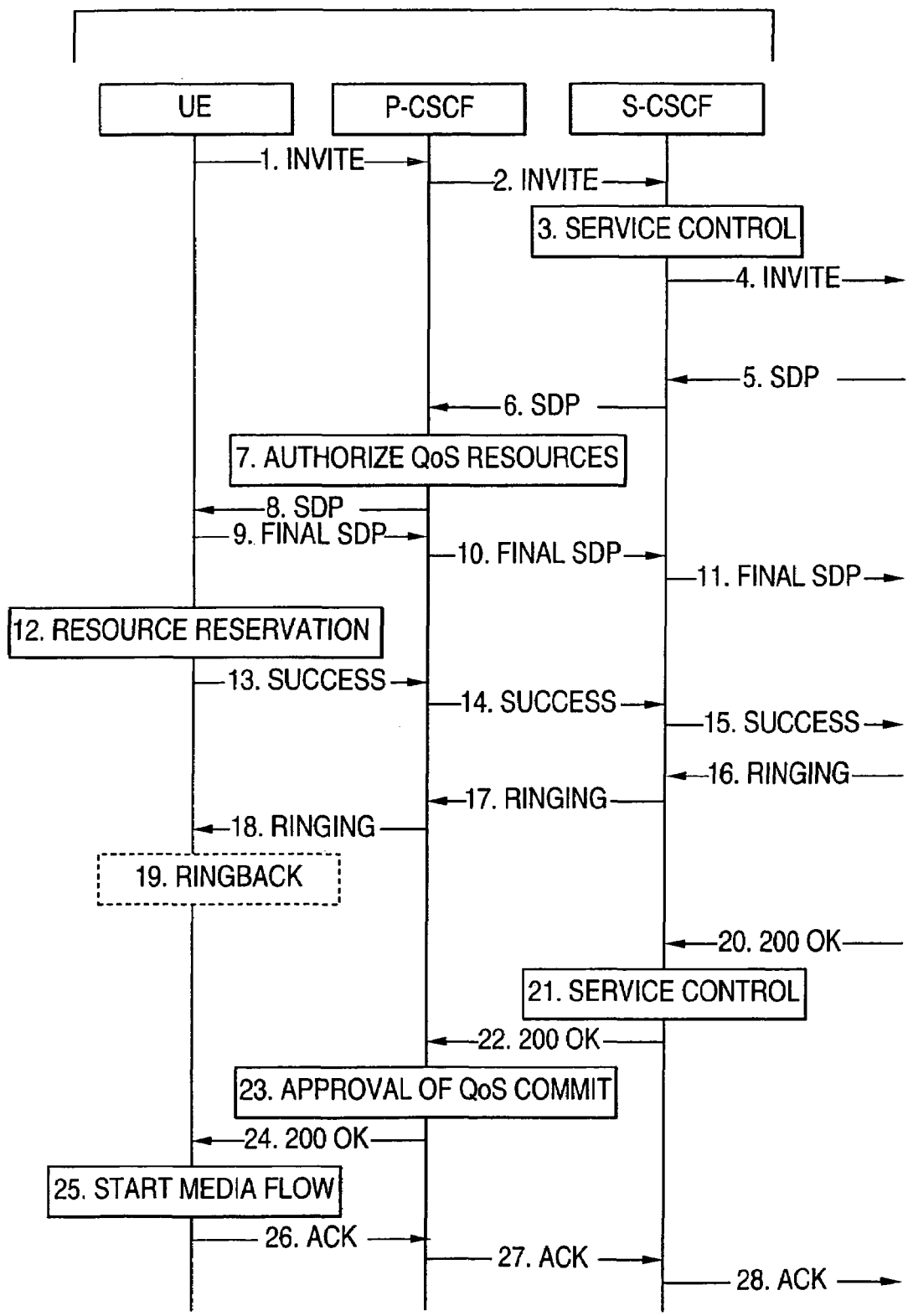

Furthermore, FIG. 7 illustrates the steps occurring in a call setup procedure and corresponds to the FIG. 5.15 of Section 5.6.2 of the second cited Technical Specification. The following steps are also described therein.
1. UE#1 sends the SIP INVITE request, containing an initial SDP, to the P-CSCF determined via the CSCF discovery mechanism. The initial SDP may represent one or more media for a multi-media session.
2. P-CSCF remembers (from the registration procedure) the next hop CSCF for this UE. In this case it forwards the INVITE to the S-CSCF in the home network.
3. S-CSCF validates the service profile, and performs any origination service control required for this subscriber. This includes authorisation of the requested SDP based on the user's subscription for multi-media services.
4. S-CSCF forwards the request, as specified by the S-S procedures.
5. The media stream capabilities of the destination are returned along the signalling path, per the S-S procedures.
6. S-CSCF forwards the SDP message to P-CSCF
7. P-CSCF authorises the resources necessary for this session
8. P-CSCF forwards the SDP message to the originating endpoint.
9. UE decides the final set of media streams for this session, and sends the Final SDP to P-CSCF.
10. P-CSCF forwards this message to S-CSCF
11. S-CSCF forwards this message to the terminating endpoint, as per the S-S procedure.
12. After determining the final media streams in step #9, UE initiates the reservation procedures for the resources needed for this session.
13. When the resource reservation is completed, UE sends the "Resource Reservation Successful" message to the terminating endpoint, via the signalling path established by the INVITE message. The message is sent first to P-CSCF.
14. P-CSCF forwards this message to S-CSCF.
15. S-CSCF forwards this message to the terminating endpoint, as per the S-S procedure.
16. The destination UE may optionally perform alerting. If so, it signals this to the originating party by a provisional response indicating Ringing. This message is sent to S-CSCF per the S-S procedure.
17. S-CSCF forwards this message to P-CSCF.
18. P-CSCF forwards the ringing message to UE.
19. UE indicates to the originating subscriber that the destination is ringing.
20. When the destination party answers, the terminating endpoint sends a SIP 200-OK final response, as specified by the termination procedures and the S-S procedures, to S-CSCF.
21. S-CSCF performs any origination service control required by session setup completion.
22. S-CSCF passes the 200-OK response back to P-CSCF, following the path of the INVITE request of step (2) above.
23. P-CSCF indicates the resources reserved for this session should now be committed.
24. P-CSCF passes the 200-OK response back to UE
25. UE starts the media flow(s) for this session.
26. UE responds to the 200 OK with an ACK message which is sent to P-CSCF.
27. P-CSCF forwards the final ACK message to S-CSCF.
28. S-CSCF forwards the final ACK message to the terminating endpoint, per the S-S procedure. Oftentimes, however, it is necessary for the MS to receive a recorded announcement from the called party rather than connecting with the called party to carry on a conversation. In such a circumstance, the recorded announcement is outputted from a node at a different address than that of the called party and the technique in accordance with the present invention facilitates the initiation of a PDP context modification procedure to set the Traffic Flow Template (TFT) according to the Transport Address (TA) of the node.

Figure 8:
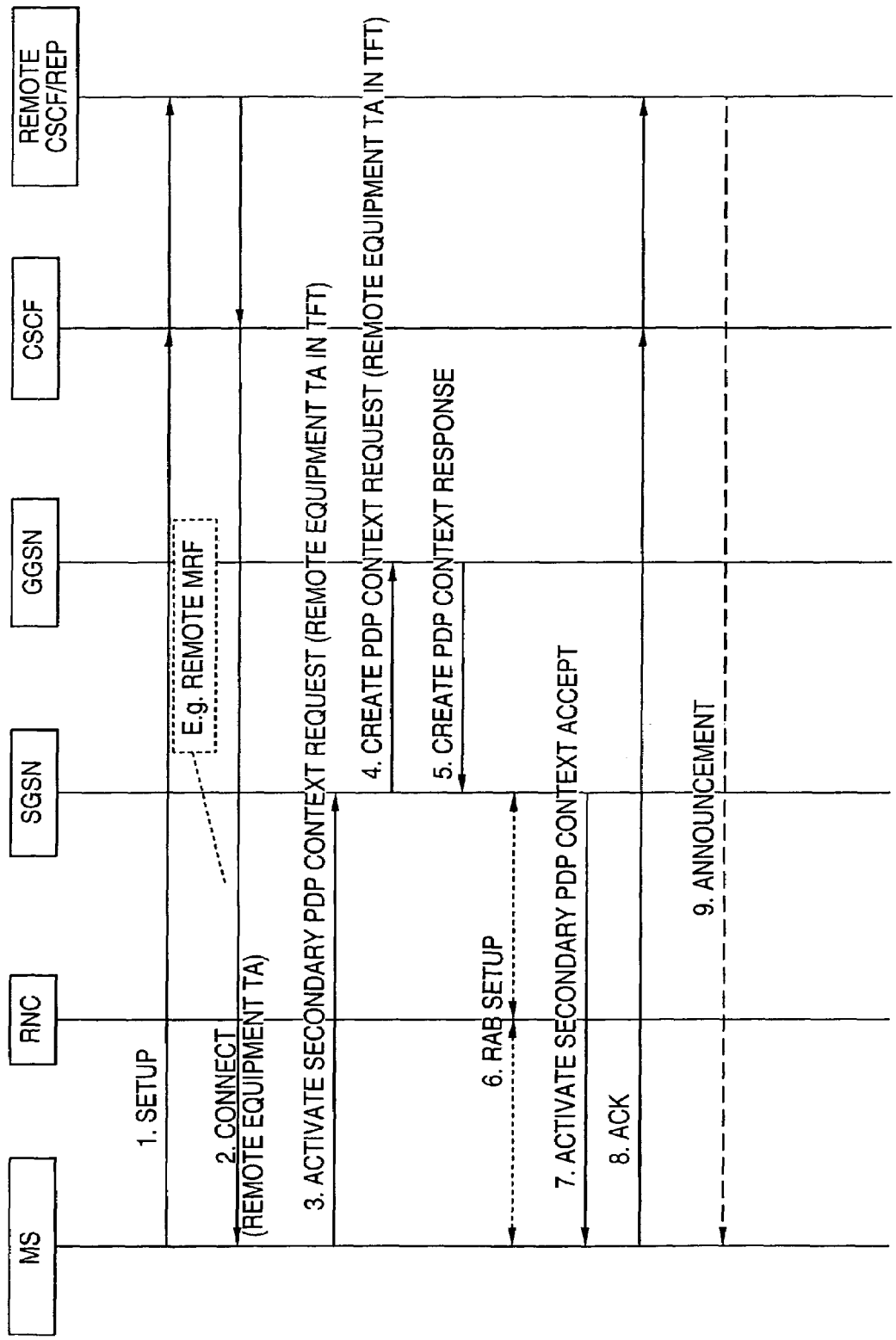
FIG. 8 illustrates an example of the steps occurring in a technique for providing announcements in mobile-originated calls in accordance with a present invention.

FIG. 8 illustrates an example of a technique for providing announcements in mobile-originated calls in accordance with the present invention.

In step #1, a setup message is sent from an MS to a peer. This setup message is intercepted by the network which has been instructed to forward an announcement message in response to a call setup to the called party. The machine that will play the announcement, referred to in the drawing figure as the Remote CSCF/REP, in step #2, acknowledges the setup message with a connect message including its IP address and Port number, that is, the Remote Equipment TA, so as to enable the MS to properly connect with it.

Subsequently, in steps #3, #4, #5, #6, and #7, the MS activates a secondary PDP context which includes a TFT allowing the machine to send traffic to the MS. That is, the TFT includes the Remote Equipment TA, (that is, its IP address and Port number).

In step #8, the MS acknowledges the acceptance of the secondary PDP context and in step #9, the Remote Equipment plays the announcement to the MS.

Thus, in accordance with the present invention, upon an MS attempting to set up a call with a called party that wishes to respond with an announcement, the Remote Equipment machine designated by the called party to make such announcement provides its TA to the MS. The MS, in turn, activates a secondary PDP context with a TFT of the Remote Equipment to allow the Remote Equipment machine to forward its announcement to the MS.

This concludes the description of the example embodiments. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will be apparent to those skilled in the art.

What is claimed is:

1. A method of providing an announcement in a communications network, the method comprising:

setting up a first level communication session for a first network element;

determining, by the communications network, that an announcement is to be played to the first network element;

sending an identity of a second network element which is to play the announcement on said first level communication session to the first network element;

setting up a second level communication session by the first network element;

setting said second level communication session parameters in accordance with the transmitted identity including initiating modification of communication channel parameters based on identity of the second network element; and playing the announcement to the first network element.

2. The method of claim 1, wherein the transmitted identity comprises an IP (Internet Protocol) address.

3. The method of claim 2, wherein the communication session comprises a PDP (Packet Data Protocol) Context.

4. The method of claim 1, wherein the transmitted identity comprises a port number.

5. The method of claim 4, wherein the communication session comprises a PDP (Packet Data Protocol) Context.

6. The method of claim 1, wherein the transmitted identity comprises a TA (Transport Address).

7. The method of claim 6, wherein the communication session comprises a PDP (Packet Data Protocol) Context.

8. The method of claim 1, wherein the communication session comprises a PDP (Packet Data Protocol) Context.

9. The method of claim 1, wherein the first network element comprises an MS (Mobile Station).

10. The method of claim 1, wherein the communication session comprises at least one PDP (Packet Data Protocol) context.

11. The method of claim 1, wherein said parameters comprise filtering information.

12. The method of claim 11, wherein said filtering information comprises a Traffic Flow Template (TFT).

13. The method of claim 1, wherein communication channel parameters are set by including a TA (Transport Address) in a TFT (Traffic Flow Template).

14. A program storage device readable by a machine, tangibly embodying a program of instructions executable by the machine to perform a method of providing an announcement in a communications network, the method comprising:

setting up a first level communication session for a first network element;

determining, by the communications network, that an announcement is to be played to the first network element;

sending an identity of a second network element which is to play the announcement on said first level communication session;

setting up a second level communication session by the first network element;

setting said second level communication session parameters in accordance with the transmitted identity including initiating modification of communication channel parameters based on identity of the second network element; and playing the announcement to the first network element.

15. The device of claim 14, wherein the transmitted identity comprises an IP (Internet Protocol) address.

16. The device of claim 15, wherein the communication session comprises a PDP (Packet Data Protocol) Context.

17. The device of claim 14, wherein the transmitted identity comprises a port number.

18. The device of claim 17, wherein the communication session comprises a PDP (Packet Data Protocol) Context.

19. The device of claim 14, wherein the transmitted identity comprises a TA (Transport Address).

20. The device of claim 19, wherein the communication session comprises a PDP (Packet Data Protocol) Context.

21. The device of claim 14, wherein the communication session comprises a PDP (Packet Data Protocol) Context.

22. The device of claim 14, wherein the first network element comprises an MS (Mobile Station).

23. The device of claim 14, wherein said communication session comprises at least one PDP Context.

24. The device of claim 14, wherein communication session parameters are set by including a TA (Transport Address) in a TFT (Traffic Flow Template).

25. The method of claim 14, wherein said parameters comprise filtering information.

26. The method of claim 25, wherein said filtering information comprises a TFT (Traffic Flow Template).

27. For a communications network comprised of network elements, one or more network element being a mobile terminal configured such that for an originating call a mobile terminal is responded to by an announcement from another network element in accordance with:

setting up a first level communication session for the mobile terminal;

determining, by the communications network, that an announcement is to be played to the mobile terminal;

sending an identity of a network element which is to play the announcement on said first level communication session to the first network element;

setting up a second level communication session by the mobile terminal based on parameters received from the communication network conforming to identity of the network element; and playing the announcement to the mobile terminal.

28. For a communications network comprised of network elements, one or more network element being configured so that for an originating call an announcement is made from a network element in response to a call setup to the called party in accordance with:

setting up of a first level communication for a first network element;

determining, by the communications network, that an announcement is to be played to the first network element;

sending an identity of a second network element which is to play the announcement on said first level communication session to the first network element; and setting up a second level communication session between the first network element and the communication network in accordance with the transmitted identity of the second network element in which the second network element plays the announcement to the first network element.

29. For a communications network comprised of network elements according to claim 28, wherein the second network element is a CSCF (Call State Control Function-Support) equipment.

30. In a communication network comprised of network elements according to claim 28, wherein the first network element is a mobile terminal and the second network element is a CSCF (Call State Control Function-Support) equipment.

* * * * *